United States Patent [19]

McGrath et al.

[11] Patent Number: 5,407,528

[45] Date of Patent: Apr. 18, 1995

[54] OXYGEN PLASMA RESISTANT POLYMERIC FILM AND FIBER FORMING MACROMOLECULES CONTAINING THE PHOSPHINE OXIDE MOIETY

[75] Inventors: James E. McGrath; Carrington D. Smith, both of Blacksburg, Va.

[73] Assignee: The Center for Innovative Technology, Herndon, Va.

[21] Appl. No.: 920,989

[22] Filed: Jul. 28, 1992

[51] Int. Cl.⁶ .............................................. B44C 1/22
[52] U.S. Cl. .............................. 156/643; 156/659.1; 156/904
[58] Field of Search ..................... 156/643, 659.1, 904

[56] References Cited

U.S. PATENT DOCUMENTS 4,357,369  11/1982  Killichowski et al. ................ 427/90

*Primary Examiner*—William A. Powell
*Attorney, Agent, or Firm*—Whitham, Curtis, Whitham & McGinn

[57] ABSTRACT

Poly(arylene ether phosphine oxide)s provide hydrolytic, thermal and oxidative stability. These materials have $T_g$s ranging from about 190°–280° C., and are more self-extinguishing than other engineering thermoplastics tested when burned due to the presence of phosphorus in a substantial amount of char. Moreover, phosphorus presence played a major role in resisting aggressive oxygen plasma environments by forming a highly oxidized, non-volatile phosphorus containing surface layer.

10 Claims, 2 Drawing Sheets

OXYGEN PLASMA RESISTANT POLYMERIC FILM AND FIBER FORMING MACROMOLECULES CONTAINING THE PHOSPHINE OXIDE MOIETY

BACKGROUND OF THE INVENTION

1. Field of the Invention

The present invention generally relates to methods of using poly(arylene ether phosphine oxide)s and, more particularly, to the use of poly(arylene ether phosphine oxide)s in applications requiring a high oxygen plasma or atomic oxygen resistant surface.

2. Description of the Prior Art

High performance engineering thermoplastics have become increasingly important in applications traditionally filled by metallic materials. Moreover, their use in the field of high strength lightweight composite resins has already found many applications in the aerospace, automotive, electronic and related industries. These industrially important thermoplastics include polyesters, polyamides, polyimides and poly (arylene ether)s (PAEs), such as the poly(arylene ether ketone)s (PEKs) and poly(arylene ether sulfone)s (PESs). The latter are tough, rigid thermoplastics with high glass transition, temperatures ($T_g$s) and/or melting temperatures ($T_m$s). Another relatively new class of engineering thermoplastics is poly(arylene ether phosphine oxide)s (PEPOs), which may be synthesized by the reaction of bis(4-chlorophenyl)phenyl phosphine oxide (BFPPO) or bis(4-chlorophenyl)methyl phosphine oxide (BFMPO) with bisphenols in various aprotic dipolar solvents utilizing sodium hydroxide or potassium carbonate as the base.

It is also well-known in the art that the presence of phosphorus in PAEs generically imparts flame-retardance to these materials. In addition, compounds such as triphenyl phosphine oxide (TPPO) have been known to be thermally stable at temperatures of up to 700° C., although the study of polymeric materials containing the triphenyl phosphine oxide moiety chemically bound within the polymer chain as flame retardant polymers has been limited. On the other hand, PESs and PEKs have been explored in terms of thermogravimetry of pyrolysis in order to obtain a more detailed analysis of the degradation process. These materials begin to degrade by chain scission at the sulfone or ketone group to give sulfur dioxide or carbon monoxide, respectively. The radicals formed from this initial reaction go on to initiate further chemistry, finally totally volatilizing the polymer at sufficiently high temperatures. Generally, the bonding around phosphorus in these polymers is to oxygen or nitrogen, such as phosphites, phosphonates or phosphazenes. Therefore, in almost all cases, oligomeric forms of these hydrolytically unstable molecules are incorporated as flame-retardant additives and not utilized as homopolymer systems.

In recent years, polyimides and PAEs have become of increasing interest for use in the aerospace industry. More specifically, these polymers have been utilized in space shuttle missions. However, it has been found that these polymers become seriously degraded by atomic oxygen (AO) while in low earth orbit (LEO). In fact, this degradation process, normally called etching, can severely reduce polymeric lifetimes. In efforts to overcome this problem, researchers have focused on developing new materials which are more resistant to $O_2$ etching. For example, Arnold et al., *Miscible Blends of Poly(siloxane Imide) Segmented Copolymers and Polybenzimidazole as Potential High Performance Aerospace Materials*, High Performance Polymers, Vol. 2, No. 2, 83 (1990), disclose blends of high performance engineering thermoplastics which exhibit stability in an aggressive AO environment. The blends are comprised of polyimide homopolymers and poly(siloxane imide) segmented copolymers based upon benzophenone tetracarboxylic dianhydride and m-diaminodiphenylsulfone, and polybenzimidazole. Wood et al., *Synthesis of New Bismaleimides Derived from Bis(3-amino phenoxy) triphenylphosine oxide and Bis(4-fluoro benzoyl)* benzene, 36th International SAMPE Symposium, 1355 (April, 1991), disclose the synthesis of bis(3-maleimido phenoxy) triphenylphosphine oxide (BMPPO) having the following structure:

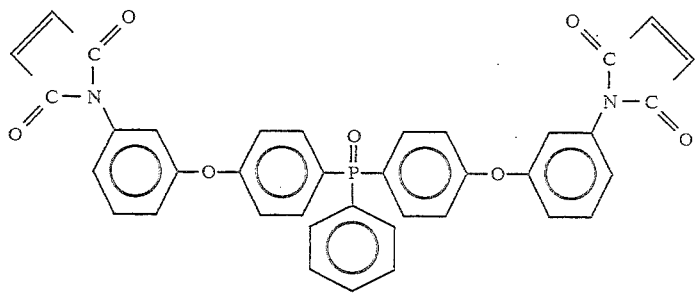

Upon curing, the material demonstrated a $T_g$ of approximately 400° C. and had unusually good fire resistance. The decreased etch rates observed for the materials disclosed by both Arnold et al. have been attributed to the generation of an inorganic, oxidation resistant silicate layer which tends to protect the polymeric underlayer to some extent.

SUMMARY OF THE INVENTION

It is therefore an object of the present invention to develop thermoplastic and thermosetting materials which are capable of forming AO resistant coatings for use in the aerospace, electronic materials and related industries.

According to the invention, PEPOs and other polymers containing the phenyl phosphine oxide bond are capable of forming a coating of a non-volatile oxidized species of phosphorus. The PAEs are synthesized by nucleophilic aromatic substitution polymerization of aromatic bisphenols with phosphorus containing activated dihalides. In the presence of a weak base, potassium carbonate, and an aprotic dipolar solvent, N-methylpyrollidone (NMP), and at temperatures around 145° C., phenate formation was accomplished quantitatively and driven toward completion via removal of the water byproduct by azeotroping with toluene. The temperature of the solution was raised to 165° C. and maintained overnight to drive the polymerization to a high extent of conversion. After workup of the amber or red solutions with inorganic salt suspensions, nearly white highly fibrous materials were obtained. High molecular weight was obvious from intrinsic viscosity measurements, which were in almost all cases above 0.60 dL/g. Also, the ability to form tough clear slightly amber films from solution or by compression molding was an indication of acceptable molecular weight formation. Stirring these materials in boiling water for an extended period of time showed no effect on the viscosity, demonstrating the hydrolytic stability of the phosphorous carbon bond. These thermoplastic materials, with $T_g$s in the range of about 200°-285° C., showed a 5% weight loss in air around 500° C. with substantial amounts of char yield at 800° C., which was related to their excellent self-extinguishing characteristics relative to other engineering thermoplastics. Additionally, the presence of phosphorus in the char after such high heating implies that these materials are resistant to aggressive oxygen plasma environments. These systems showed extremely low amounts of etching in oxygen plasma when compared to other engineering polymers. The presence of phosphorus residues after either burning or etching with oxygen plasma indicated that these PEPOs could play crucial roles in areas such as microwave electronics processing, imaging science and the aerospace industry.

BRIEF DESCRIPTION OF THE DRAWINGS

The foregoing and other objects, aspects and advantages will be better understood from the following detailed description of the preferred embodiments of the invention with reference to the drawings in which.

DETAILED DESCRIPTION OF THE PREFERRED EMBODIMENTS OF THE INVENTION

Figure 1:
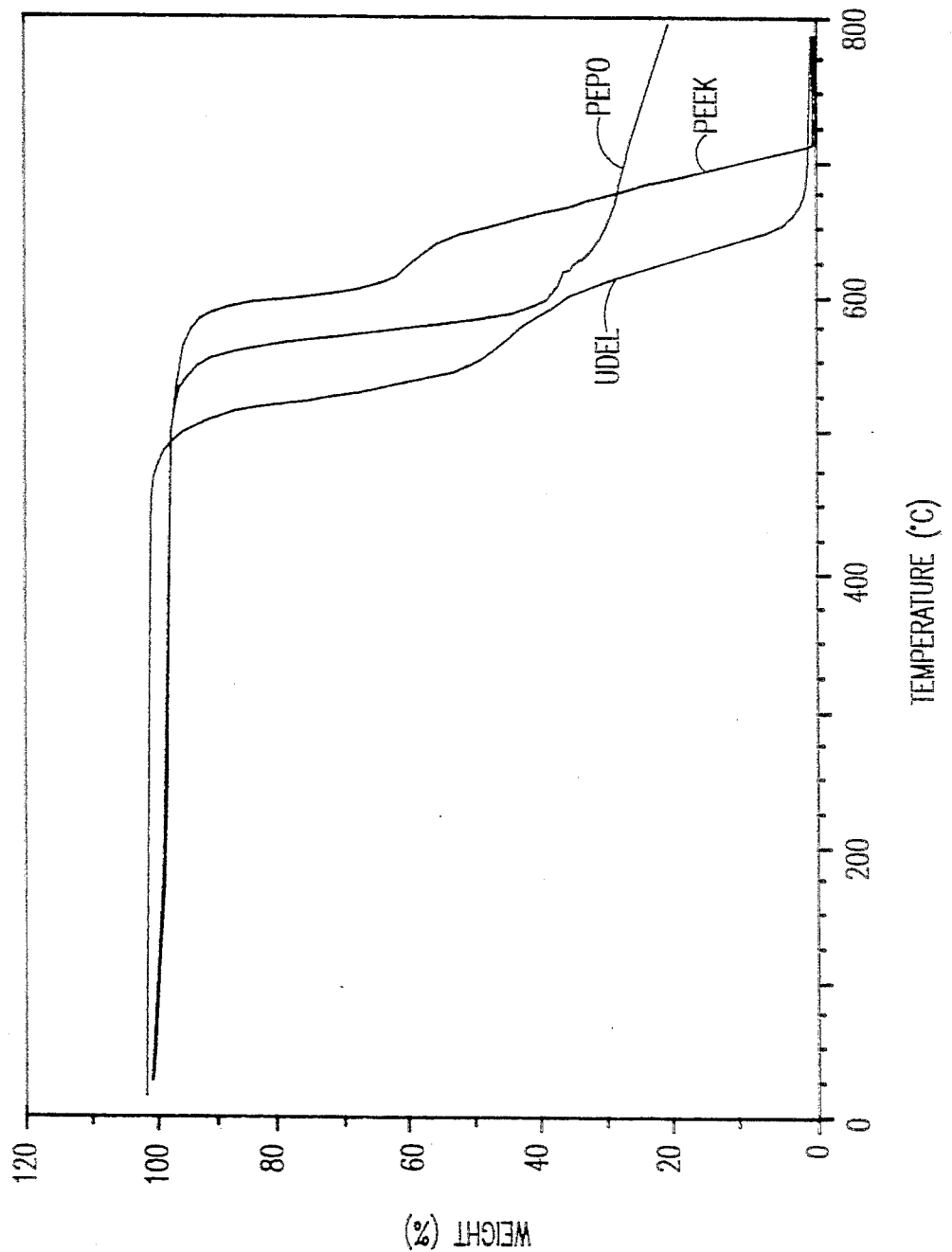
FIG. 1 shows dynamic thermogravimetric analysis (TGA) scans in air for UDEL, PEEK, and PEPO.

PEPO homopolymers, capable of forming a coating of a non-volatile oxidized species of phosphorus were prepared via nucleophilic aromatic substitution polycondensations of BFPPO and BFMPO with various aromatic bisphenols in the presence of a weak base and an aprotic dipolar solvent. These homopolymers were found to be resistant to aggressive oxygen plasmas and atomic oxygen, which are important in microelectronics processing and aerospace lower earth orbit exposed polymeric materials. The phosphine oxide moiety which is present in the homopolymers may cause the homopolymers to undergo selective surface degradation to a layer of some higher oxidized state of phophorus containing some organic structures, possibly including phosphates.

Solvents and general reagents utilized in the preparation of the homopolymers were prepared as follows: NMP and dimethylacetamide (DMAC) were prepared by vacuum distillation over calcium hydride and stored in an anhydrous environment prior to use. NMP and DMAC are commercially available dipolar aprotic solvents. Anhydrous potassium carbonate was dried at 100° C. and stored in a dessicator. Dry tetrahydrofuran (THF) was obtained through distillation over a sodium/benzophenone complex. Biphenol A (BIS A) was recrystallized from toluene and dried in vacuo overnight. Both anhydrous potassium carbonate and toluene are commercially available from Fisher. BIS A is available through Dow Chemicals. Biphenol (BP) (97%) was recrystallized from deoxygenated acetone and dried in vacuo. High purity 9,9-bis(4-hydroxyphenyl)-fluorene (FL) samples were supplied by NASA, Langley.

In order to prepare phosphorus containing monomers susceptible to nucleophilic aromatic substitution, a Grignard-type synthesis was utilized. The Grignard pathway was chosen because it has comparatively few steps and provides high yields of pure all para isomers. Alternatively, a Friedel-Crafts type reaction could be used to synthesize the desired activated dihalides.

BFPPO was prepared and purified by the Grignard technique as follows: 85.1 g (3.5 mol) magnesium turnings and 3.51 dry THF were added to a flame dried 5 liter 4-neck round bottom flask fitted with an overhead mechanical stirrer, an addition funnel and a nitrogen inlet. The solution was stirred at a temperature of 5° C. and 618.7 g (3.5 mol) 4-bromofluorobenzene (99%, available from Aldrich) was added dropwise over 3–4 hours. The resulting solution was stirred at room temperature overnight to give a gray slightly cloudy mixture. 351.8 g (1.75 mol) phenylphosphonic dichloride (97%, Aldrich) was then added dropwise at 5° C. over 3–4 hours. The solution was stirred at room temperature overnight to yield a clear yellow mixture. 10% aqueous sulfuric acid was added to make the solution acidic to litmus. About 1 liter of water was then added and the mixture was allowed to separate into organic and aqueous layers. If separation did not occur, diethyl ether was added to induce phase separation. The aqueous layer was washed well with ether/THF mixtures and all organic phases were combined. The ether solvents were stripped off to give wet product, which was dissolved in toluene and azeotroped for several hours over activated charcoal. Filtration through celite gave a clear orange solution. Toluene was then stripped off and the crude product was twice subjected to short path distillation under reduced pressure at 160°-170° C., typically yielding 70–80% white crystalline polymer grade BFPPO having a melting point (m.p.) of 124°-126° C.

BFMPO was synthesized from methylphosphonic dichloride and 4-bromofluorobenzene using a similar technique. Purification procedures were similar to those utilized in the preparation of BFPPO with the added benefit of being able to sublime the BFMPO. Yields for monomer grade material were in the range of 70–80% (m.p. 112°-114° C.).

Nucleophilic aromatic substitution polymerization of BFPPO and BFMPO yielded PEPOs having the following chemical formulas:

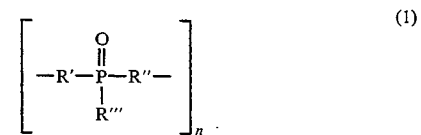

(1)

-continued $$\left[ -R'-\underset{\underset{R'''}{|}}{\overset{\overset{O}{\|}}{P}}-R''-O-Ar-O- \right]_n \quad (2)$$

where n is greater than 3 and R', R" and R''' are aryl or alkyl groups and Ar has any one of the following chemical formulas:

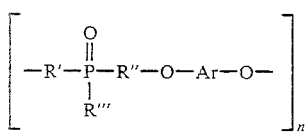 BIS A

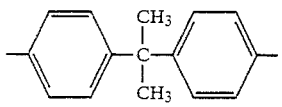 HQ

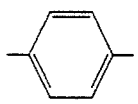 BP

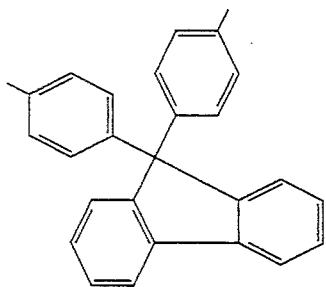 FL

Essentially quantitative yields of crude products were synthesized which, after workup, could then be purified by short path distillation or sublimation, typically giving purified yields in excess of 70%. Purity could be confirmed spectroscopically or by elemental analysis. PEPO like compounds could also be made where the R', R", and R''' groups are heterocyclic (e.g., imides, etc.).

A representative procedure for the preparation of the PEPO homopolymers was as follows: a high molecular weight BIS A PEPO was prepared by adding 5.707 g (0.025 mol) BIS A and 7.856 g (0.025 mol) BFPPO to a 250 ml 4-neck round bottom flask, equipped with an overhead stirrer, a nitrogen inlet, a Dean-Stark trap with condenser, and a thermometer. The teflon coated pans from which the monomers were transferred were rinsed into the flask with NMP, to a total volume of 90 ml NMP. A 5% excess of $K_2CO_3$ (4.15 g, 0.03 mol) and 45 ml toluene were added to the reaction mixture. The temperature was held at approximately 150°–155° C. by a high temperature silicone oil bath and the solution was maintained under a constant nitrogen purge. After formation of the water and toluene azeotrope, the system was allowed to dehydrate for about four hours. The temperature of the mixture was then raised to 165°–170° C. and held constant for about sixteen hours. The appearance of the resulting solution was that of a dark brown viscous mixture with a white inorganic salt suspension. Finally, the mixture was allowed to cool to room temperature, diluted with chloroform, and filtered. The solution was neutralized using glacial acetic acid which yielded a clear brown to amber mixture. This solution was precipitated in a 80:20 methanol:water mixture in a high speed blender to yield a nearly white highly fibrous material. The polymer was dried overnight at 100° C. under vacuum, redissolved in chloroform, filtered, neutralized, reprecipitated in methanol and dried again under the same conditions. Other homopolymers were prepared using HQ, BP and FL in place of BIS A by similar procedures and then characterized for use as protective coatings against AO degradation by Differential Scanning Calorimetry (DSC) and TGA, pyrolysis, oxygen plasma etching and XPS according to the methods described in detail in Examples 1–4.

Table 1 shows the results of investigations of the $T_g$s of these PEPO materials using DSC.

TABLE 1

| | Characteristics of PEPO's | | |
|---|---|---|---|
| BISPHENOL | $\eta$ (dL/g) $CH_2Cl_2$ | $T_g$ (°C.)* | $T_{gA}$ (°C.)** |
| R''' = ARYL | | | |
| BIS A | 1.38 | 205 | 490 |
| HQ | 1.03 | 215 | 520 |
| BP | 2.25 | 245 | 520 |
| FL | 0.60 | 282 | 530 |
| UDEL | 0.40 | 190 | 495 |
| R''' = ALKYL | | | |
| BIS A | 1.04 | 195 | 470 |
| HQ | 0.72 | 207 | 500 |
| BP | 0.75 | 234 | 495 |
| FL | 0.30 | 272 | 500 |

*Values from second run after quench cool from first run
**Values are temperature at 5% weight loss in air The transition temperatures of the PEPOs were comparable to those of PESs. Typically a 5°–10° C. increase in $T_g$ of the PEPO thermoplastics over the PESs was observed. Additionally, when comparing the phenyl and methyl substituents bonded to phosphorus along the polymer backbones, only a slight decrease (about 10° C.) in $T_g$ was noted, coincidentally corresponding to the difference in melting points of the starting monomers. The methyl pendant PEPO materials displayed slightly lower thermal stability than their all aromatic counterparts, but the 5% weight loss difference was only about 20°–30° C. when dynamically testing the polymers in air.

Formation of char appears to play an important role in the self-extinguishing properties of engineering thermoplastics. In order to qualitatively describe the behavior of the PEPO polymers when burned, films on the order of 0.5–1 mm thick were exposed to a bunsen burner flame in air for constant amounts of time, then removed after a predetermined period in the flame. The chemical structures of various thermoplastics utilized in testing along with the phosphorus containing PEPOs are shown below:

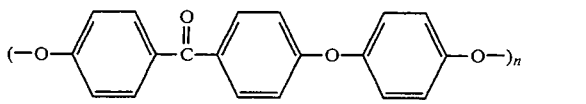
FEEK

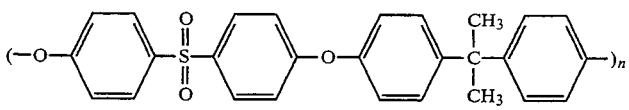
UDEL

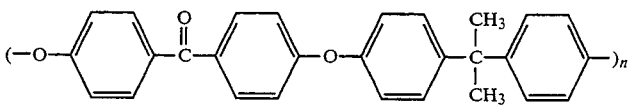
BIS A FEK

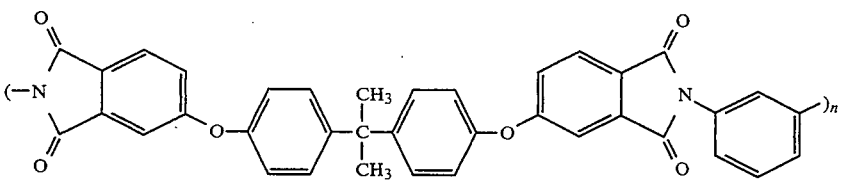
ULTEN

In all cases, non-phosphorus containing engineering thermoplastics (PEEK, UDEL, ULTEM polyimide, etc.) with very high limiting oxygen index (LOI, which is correlated to char yield) values appeared to completely volatilize. Conversely, all phosphorus containing PEPO polymers immediately extinguished upon removal from the flame. This test could be repeated several times for any single PEPO sample. As a consequence of these qualitative results, an effort was put forth to examine both the volatile and non-volatile portions of several engineering thermoplastics compared with the same for PEPO.

FIG. 1 shows the TGA thermograms of some commercially available engineering thermoplastics, PEEK and UDEL PSF, and a phosphorus containing PEPO, BP PEPO. One of the immediate observations which was made on the TGA thermograms of the PEPO was the high degree of char yield between 600°–800° C. The non-phosphorus containing polymers were completely volatilized by 700° C., but the PEPO typically showed between 20–40% char yield. Further, the PEPO showed a 0.5% and 3% weight loss at 300° and 350° C. in air, respectively, over an eight hour period in isothermal degradation studies. Similar characteristics to those of the PEPO homopolymer were observed for any polymeric system containing phosphorus; that is, all homopolymers, blends and copolymers showed significant char yields at these very high temperatures. The PEPO amorphous thermoplastics also showed excellent thermal stability, losing only 5% of their weight around 500° C.

Table 2 shows the char yields of PEPO systems upon pyrolysis.

TABLE 2

| Char Yields of Pepo Systems Upon Pyrolysis | | |
|---|---|---|
| | % YIELD DATA | |
| PEPO POLYMER | RESIDUE (CHAR) | PYROLYSATE |
| BIS A | 31.0 | 65.8 |
| HQ | 49.7 | 53.4 |

TABLE 2-continued

| Char Yields of Pepo Systems Upon Pyrolysis | | |
|---|---|---|
| | % YIELD DATA | |
| PEPO POLYMER | RESIDUE (CHAR) | PYROLYSATE |
| BP | 43.4 | 31.6 |

The large amounts of char formed in all cases with PEPO, along with the fact that very few phosphorus containing volatiles were identified, pointed to the presence of phosphorus in the char.

In order to confirm the presence of phosphorus in either the char or volatile functions of the decomposition products, NAA was employed. Table 3 summarizes the data from NAA experiments on both pyrolysis volatiles and char.

TABLE 3

| Neutron Activation Analysis of PEPO Materials Before and After Pyrolysis | | | |
|---|---|---|---|
| | | PHOPHORUS CONTENT (WT %) | |
| PEPO POLYMER | | CALCULATED | NAA |
| BIS A: | INITIAL | 6.2 | 6.4 |
| | CHAR | — | 12.0 |
| | VAPOR | — | 2.2 |
| HQ: | INITIAL | 8.1 | 9.0 |
| | CHAR | — | 15.6 |
| | VAPOR | — | 0.9 |
| BP: | INITIAL | 6.6 | 6.8 |
| | CHAR | — | 12.6 |
| | VAPOR | — | 1.7 |

Using NAA, it was confirmed that phosphorus containing degradation products were primarily non-volatile. Again, it should be noted that other PAEs gave essentially no char to analyze at 600° C. in air, while the PEPO materials all gave substantial amounts of char at 600° C. in air. Clearly, the char is much richer in phosphorus than the initial polymer. In all cases, the char is approximately double the content of phosphorus compared to the undegraded PEPO sample, while the volatile fraction typically contains 1–2% phosphorus. Thus, it can be concluded that phosphorus presence along the backbone of these PAEs promotes primarily carbonaceous char formation upon pyrolysis, while chemistry in the gas phase probably plays only a minor role in the self-extinguishing behavior.

Figure 2:
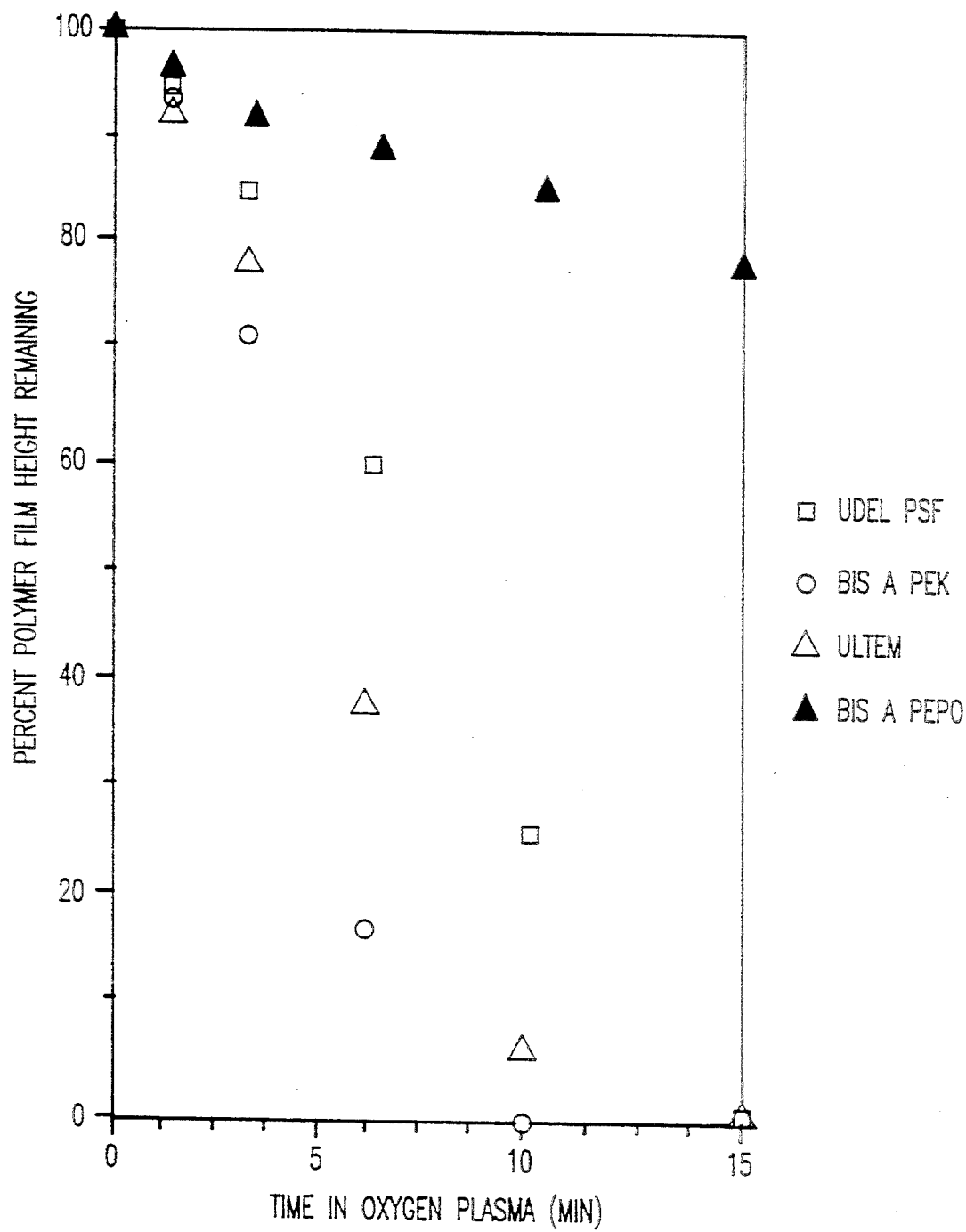
FIG. 2 shows the results of oxygen plasma etching for a PEPO versus other engineering thermoplastics.

In order to investigate the effects of oxygen plasma upon PEPOs and related PAEs, four polymers were selected for comparison. BIS A PEPO, UDEL PSF and BIS A PEK and ULTEM were chosen as representative samples. The only difference in structure between these polymers is the presence of the phosphine oxide unit along the backbone. Ellipsometry was utilized as a quantitative tool to observe the decrease in height of 1000 Å films over time in a radio frequency generated oxygen plasma. FIG. 2 shows the results which are plotted as percent polymer height remaining vs. time in the oxygen plasma. The PEPO material clearly outperformed the UDEL PSF, BIS A PEK and ULTEM by a substantial margin. While the UDEL PSF, BIS A PEK and ULTEM films were totally volatilized after only 15 minutes in the oxygen plasma, the BIS A PEPO material still maintained 80% of its original height. Additionally, several other commercially available engineering thermoplastics were tested and showed characteristics similar to UDEL PSF, BIS A PEK and ULTEM. This difference in performance is unexpected for such a small chemical difference in polymer structure. Moreover, the behavior of all phosphorus containing engineering thermoplastics was observed to be generic. It should be noted that these were unmodified homopolymeric high performance thermoplastics displaying behavior only noticed in the past for modified or copolymer systems. In fact, this data supports a mechanism for the formation of a unique surface protective layer never before observed for polymeric materials.

In an effort to deduce the chemical changes which had occurred at the film surface during oxygen plasma treatment, XPS was employed to gain an understanding of the changes in surface chemistry which led to greatly reduced rates of PEPO ablation. The atomic concentration for the BIS A PEPO, BP PEPO and UDEL polysulfone films before and after a five minute oxygen plasma exposure are listed in Table 4 below:

TABLE 4

XPS Analysis fo PEPO and UDEL Polymer Films Before and After 5 Minute Oxygen Plasma Treatment

| ELEMENT | BP PEPO | BIS A PEPO | UDEL |
|---|---|---|---|
| CARBON | 88.3/46 | 89.2/42 | 84.0/63 |
| OXYGEN | 8.5/40.6 | 7.6/43 | 13/32.3 |
| SULFUR | — | — | 3/3.2 |
| PHOSPHORUS | 3.2/10.4 | 3.1/11.3 | — |

After a five minute oxygen plasma exposure, all samples displayed a large increase in the oxygen content. For both PEPO samples, there was also an increase in phosphorus content, while the polysulfone showed little change in the sulfur atomic concentration. The presence of nitrogen, which is not present in the original backbone structure, was observed for both the PEPO and polysulfone samples after exposure to the plasma. This finding may be attributed to the reaction of excited species on the plasma treated surface with air during sample transfer or to the relatively low vacuum used in the reaction chamber.

EXAMPLE 1

DSC and TGA were carried out on a DuPont model 912 instrument, both at a heating rate of 10° C./min. The reported $T_g$s from DSC were obtained on the samples which had been cold pressed and secured in crimped aluminum pans. Scans were run at 10° C./min and the reported values were taken from the second run, after a quench cool from the first run unless otherwise noted. TGA analyses were run in flowing air at a 10° C./min heating rate and values reported are for the temperature at 5% weight loss. Intrinsic viscosity measurements on the materials were performed at room temperature using Cannon Ubbelohde viscometers. Dynamic mechanical and dielectric thermal analyses, DMTA and DETA, respectively, were performed on Polymer Laboratories instruments. DMTA experiments were carried out at 1 Hz at 5° C./min on 2 mil thick compressed bars of the desired material. The pressed bars were obtained by compressing the samples 50° C. above their $T_g$s for 15 min, then quenched cool. Storage moduli (E') and loss tangent (tan δ) values were recorded.

EXAMPLE 2

Samples were pyrolyzed in air at 600° and 700° C. with a quartz tube/furnace pyrolysis unit. Volatile pyrolysates were condensed at −100° C. at the front of a 30 m DB-5 fused silica capillary column. The oven temperature, initially at −100° C. for 3 minutes, was ramped at 20° C./min to 0° C. and then 7° C./min to 300° C. Three minutes after the onset of pyrolysis, spectra covering a range of m/z 33 to 650 were obtained by scanning every second. Product identities were confirmed based on substantial model compound studies.

EXAMPLE 3

A Plasmod plasma chamber from the Tegal Corporation was utilized as the oxygen plasma atmosphere for the etching experiments. A 13.56 MHz radio frequency generated oxygen plasma operated at 50 W of power and a pressure of approximately 1.2 torr were the specific parameters of this chamber. Ellipsometry was used to measure the thickness of very thin spin coated polymer films on ferrotype plates (chrome plated steel from Thompson Photoproducts) before and during the etching process. A Gaertner Dual Mode Automatic Ellipsometer Model L116A was utilized and plates were first cleaned by oxygen plasma treatment for 20 minutes followed by deionized water and acetone rinses. This treatment was repeated and the plates were then dried at room temperature under a nitrogen flow. Optical constants were then determined on the cleaned plates by ellipsometry. Spin coating techniques were employed to generate very thin polymer films (ca. 800–1800 Å) on the ferrotype plates from dilute solution. Concentrations ranged from 1–4% (w/v) and a variety of solvents were used including methylene chloride, chloroform, or chlorobenzene. Samples were then dried in a vacuum oven at 50° C. for the low boiling solvents and 100° C. for chlorobenzene. Film thicknesses were measured from at least four spots. Measurements were taken at 30°, 50° and 70° angles of incidence and reflection to guarantee that small refractive index changes on the surface due to plasma treatment did not give rise to significant errors in measurements. The thin films were subjected to the oxygen plasma for different periods of time. Samples were initially treated for one minute, then an additional two, three, etc., up to a five minute treatment. Between each plasma treatment, ellipsometry was used to measure film thickness, and each sample was exposed for a total of fifteen minutes. It was observed that any treatment in excess of about five minutes at one time gave rise to unacceptable heating of the ferrotype plate. Representations of the data were plotted as percent polymer film height remaining as a function of time, based on an initial height of 1000 Å.

EXAMPLE 4

X-ray photoelectron spectroscopy (XPS) analysis was performed using a Perkin-Elmer PHI 5300 spectrometer employing a MgKα (1253.6 eV) achromatic x-ray source operated at 15 KeV with a total power of 400 watts. Typical operating pressures were $<1\times10^{-7}$ torr and the surface area analyzed was either a 1 mm circular spot or a 1×3 mm rectangle. The spectrometer was calibrated to the 4f 7/2 photopeak of gold at 83.8 eV and the 2p 3/2 photopeak of copper at 932.4 eV, and all binding energies were referenced to the main C-H photopeak at 285 eV.

While the invention has been described in terms of several preferred embodiments, those skilled in the art will recognize that the invention can be practiced with modification within the spirit and scope of the appended claims.

Having thus described our invention, what we claim as new and desire to secure by Letters Patent is as follows:

1. A method of protecting a surface from oxygen plasma degradation, comprising the step of applying a compound to said surface, said compound having the chemical formula:

$$\left[ -R'-\underset{\underset{R'''}{|}}{\overset{\overset{O}{\|}}{P}}-R''- \right]_n$$

wherein R', R" and R''' are aryl, heterocyclic or alkyl groups and n is greater than 3.

2. A method of protecting a surface from oxygen plasma degradation, comprising the step of applying a compound to said surface, said compound having the chemical formula:

$$\left[ -R'-\underset{\underset{R'''}{|}}{\overset{\overset{O}{\|}}{P}}-R''-O-Ar-O- \right]_n$$

wherein n is greater than 3 and R', R" and R''' are aryl, heterocyclic or alkyl groups and Ar is selected from the group consisting of:

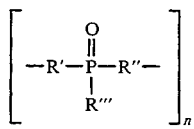
(a)

(b)

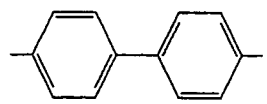
(c)

and

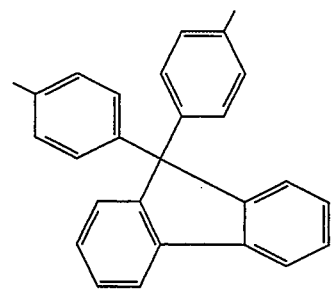
(d)

3. A method as recited in claim 2 wherein Ar has the chemical formula:

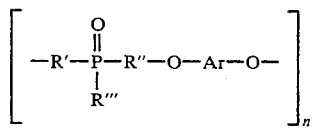

4. A method as recited in claim 2 wherein Ar has the chemical formula:

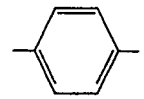

5. A method as recited in claim 2 wherein Ar has the chemical formula:

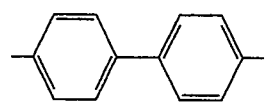

6. A method as recited in claim 2 wherein Ar has the chemical formula:

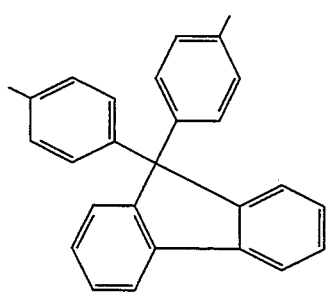

7. A method of protecting a microelectronics structure during reactive ion etching, comprising the step of applying a compound to said microelectronics structure, said compound having the chemical formula:

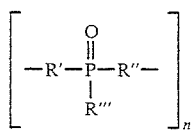

wherein R', R" and R'" are aryl, heterocyclic or alkyl groups and n is greater than 3.

8. A method of protecting a microelectronics structure during reactive ion etching, comprising the step of applying a compound to said microelectronics structure, said compound having the chemical formula:

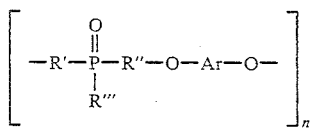

wherein n is greater than 3 and R', R" and R'" are aryl, heterocyclic or alkyl groups and Ar is selected from the group consisting of:

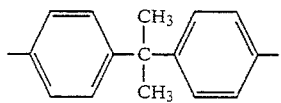   (a)

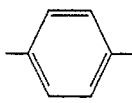   (b)

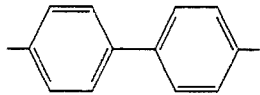   (c)

and

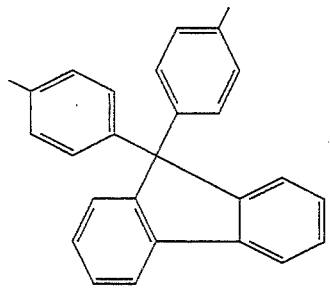   (d)

9. A method of protecting a structure in an aerospace environment from atomic oxygen degradation, comprising the step of applying a compound to said microelectronics structure, said compound having the chemical formula:

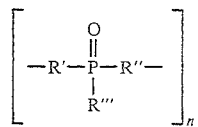

wherein n is greater than 3 and R', R" and R'" are aryl, heterocyclic or alkyl groups.

10. A method of protecting a structure in an aerospace environment from atomic oxygen degradation, comprising the step of applying a compound to said microelectronics structure, said compound having the chemical formula:

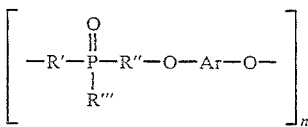

wherein n is greater than 3 and R', R" and R'" are aryl, heterocyclic or alkyl groups and Ar is selected from the group consisting of:

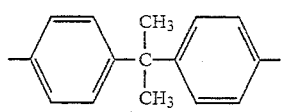   (a)

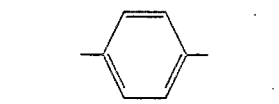   (b)

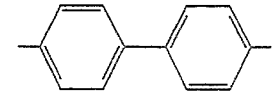   (c)

and

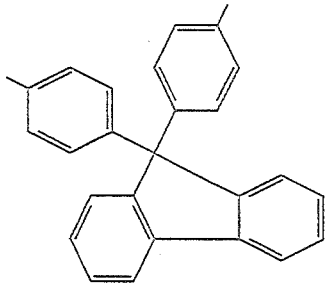   (d)

* * * * *